(12) United States Patent
Deshpande

(10) Patent No.: US 7,191,246 B2
(45) Date of Patent: Mar. 13, 2007

(54) TRANSMISSION RATE SELECTION FOR A NETWORK OF RECEIVERS HAVING HETEROGENOUS RECEPTION BANDWIDTH

(75) Inventor: Sachin G. Deshpande, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 665 days.

(21) Appl. No.: 09/908,677

(22) Filed: Jul. 18, 2001

(65) Prior Publication Data

US 2003/0033425 A1    Feb. 13, 2003

(51) Int. Cl.
*G06F 15/16* (2006.01)

(52) U.S. Cl. ............ 709/233; 709/223; 709/224; 709/232; 370/234; 370/468

(58) Field of Classification Search ........ 709/217, 709/223–224, 230–233, 219; 370/229, 236, 370/252, 352, 233–235, 468, 290
See application file for complete search history.

(56) References Cited

U.S. PATENT DOCUMENTS

| | | | |
|---|---|---|---|
| 5,675,576 A | | 10/1997 | Kalampoukas et al. |
| 5,742,594 A | | 4/1998 | Natarajan |
| 5,799,002 A | * | 8/1998 | Krishnan ............ 370/234 |
| 5,914,945 A | | 6/1999 | Abu-Amara et al. |
| 5,930,473 A | | 7/1999 | Teng et al. |
| 6,097,697 A | * | 8/2000 | Yao et al. .............. 370/230 |
| 6,125,397 A | * | 9/2000 | Yoshimura et al. ....... 709/235 |
| 6,134,217 A | | 10/2000 | Stiliadis et al. |
| 6,219,712 B1 | * | 4/2001 | Mann et al. ............. 709/235 |
| 6,275,471 B1 | * | 8/2001 | Bushmitch et al. ....... 370/248 |
| 6,560,243 B1 | * | 5/2003 | Mogul ................... 370/468 |
| 6,567,420 B1 | * | 5/2003 | Tiedemann et al. ....... 370/468 |
| 6,577,599 B1 | * | 6/2003 | Gupta et al. ............ 370/236 |
| 6,618,752 B1 | * | 9/2003 | Moore et al. ........... 709/217 |
| 6,701,372 B2 | * | 3/2004 | Yano et al. ............. 709/232 |
| 6,754,699 B2 | * | 6/2004 | Swildens et al. ........ 709/217 |
| 6,853,625 B2 | * | 2/2005 | Burmeister et al. ...... 370/252 |
| 6,959,327 B1 | * | 10/2005 | Vogl et al. ............. 709/219 |
| 7,020,714 B2 | * | 3/2006 | Kalyanaraman et al. ... 709/235 |
| 2002/0114274 A1 | * | 8/2002 | Sturges et al. ......... 370/229 |
| 2003/0005112 A1 | * | 1/2003 | Krautkremer ............ 709/224 |
| 2003/0016630 A1 | * | 1/2003 | Vega-Garcia et al. ..... 370/252 |
| 2003/0169681 A1 | * | 9/2003 | Li et al. ............... 370/203 |
| 2003/0231621 A1 | * | 12/2003 | Gubbi et al. ........... 370/352 |
| 2004/0057420 A1 | * | 3/2004 | Curcio et al. .......... 370/352 |

OTHER PUBLICATIONS

Jiang et al., Inter-receiver Fairness: A Novel Performance Measure for Multicast ABR Sessions, Proc. ACM Sigmetrics, Madison, Wisc., Jun. 1998.

(Continued)

*Primary Examiner*—Thu Ha Nguyen
(74) *Attorney, Agent, or Firm*—Chernoff, Vilhauer, McClung & Stenzel

(57) ABSTRACT

A method of selecting a data transmission rate for a heterogeneous network clusters the results of reports of local reception bandwidth and determines an appropriate data transmission rate that either minimizes data loss or minimizes a cost function relating distortion and local bandwidth utilization for each cluster.

15 Claims, 2 Drawing Sheets

OTHER PUBLICATIONS

Jiang et al., Inter-Receiver Fair Multicast Communication Over the Internet, Proc. of the 9th International Workshop on Network and Operating Systems Support for Digital Audio and Video (NOSSDAV), Jun. 1999, pp. 103-114.

Smith et al., Bandwidth Allocation for Layered Multicasted Video, Proc. of the IEEE International Conference on Multimedia Computing and Systems (ICMCS), Jun. 1999, Florence, Italy.

Casner et al., RTP: A Transport Protocol for Real-Time Applications, Internet Engineering Task Force (IETF), Jan. 2000.

McCanne et al., Receiver-driven Layered Multicast, Proc. of Association for Computing Machinery SIGCOMM, Sep. 1996, Standford, CA.

Radha et al., Fine-Granular-Scalable Video for Packet Networks, Packet Video '99, Apr. 1999, Columbia University, NY.

ITU-T/SG15, Video Codec Test Model, Near-Term, Version 10 (TMN 10), Draft 1, ITU-International Telecommunications Standardization Sector, Apr. 1998, Tampere, Finland.

Jiang et al., On the Use of Destination Set Grouping to Improve Inter-receiver Fairness for Multicast ABR Sessions, Mar. 2000, INFOCOM 2000, vol. 1, Tel Aviv, Israel.

* cited by examiner

TRANSMISSION RATE SELECTION FOR A NETWORK OF RECEIVERS HAVING HETEROGENOUS RECEPTION BANDWIDTH

CROSS-REFERENCE TO RELATED APPLICATIONS

Not applicable.

BACKGROUND OF THE INVENTION

The present invention relates to data processing networks and, more particularly, to a method of selecting data transmission rates for a network of receivers having heterogeneous reception bandwidth.

The increased capacity and flexibility of the Internet and other data processing networks have increased the practicality and popularity of delivering data processing services over these networks. However, data transmission over networks connecting large numbers of receivers can be problematic. For example, many applications, such as multimedia applications, require relatively high bandwidth. A 25 second long, 320×240 Quick Time video may require 2.3 MB, approximately equivalent to one thousand screens of textual data. In addition, the data stream for a multimedia application is often characterized by bursts of data and, unless the transmission rate is smoothed, the limited reception buffers of data receivers may overflow or underflow causing loss of data and poor quality service. Second, many applications require real-time data delivery. If the network is congested and delivery is delayed, the data becomes obsolete and will be dropped. Some applications, such as real time video and voice transmission, are characterized by a level loss tolerance where the quality of the service is degraded by data loss but may still be tolerable to the user. Other applications may rely on forward error correction (FEC) or data retransmission separate from the usual multicast transmission to recover from data losses. However, attempts to retransmit lost data packets can aggravate network congestion producing additional data loss.

On the other hand, the limited bandwidth of data processing networks is typically shared by many users utilizing data receivers with differing local reception bandwidth. For example, a receiver connected to the Internet may be connected through a 28.8 Kbps modem, a 56 Kbps modem, a digital subscriber line (DSL) (typically, 256 Kbps bandwidth), a cable modem, or a local area network (LAN) connection (10 Mbps or greater bandwidth). While the network connection is one source of bandwidth limitation for a receiver, the bandwidth of one or more receivers may also be limited by a bottleneck link in the network path connecting the receivers and the data transmitter. Further as a result of congestion, the bandwidth of the network links in the path to the receiver may vary substantially throughout a typical network session.

Variation in local reception bandwidth is a frustrating factor for unicast data transmission where one server and one client exchange data. However, multimedia applications are often delivered simultaneously to many users by multicast transmission. In a multicast delivery, a server transmits a plurality of data streams to a plurality of multicast group addresses. An individual receiver can subscribe to a multicast group address providing a maximum data rate not exceeding the receiver's local reception bandwidth and, therefore, the highest quality service available to the receiver considering its limited local bandwidth. Allocating data transmission rates to preserve the quality of the service and optimize the data rate for each receiver, while avoiding network congestion, is a difficult task.

Layered encoding is a technique providing a plurality of incrementally encoded data streams. A base layer is transmitted at a rate providing good service for receivers having a bandwidth at the lower end of the range supported by the service. Data is also encoded in one or more additional or enhancement layers that can be incrementally combined by receivers having greater reception bandwidth to provide progressively higher levels of quality for the application. For example, a video base layer might be encoded at a minimum data rate to provide acceptable video at a receiver connected to the network with a 56 Kbps modem. Each additional enhancement layer provides improved video quality but requires an incremental increase in bandwidth and is thus suitable only for receivers having a bandwidth greater than 56 Kbps, for examples, receivers with DSL or Ethernet connections. Receiver-driven layered multicast provides a mechanism for a receiver to subscribe to one or more enhancement layers as permitted by the receiver's limited reception bandwidth thereby maximizing the quality at each of the receivers of the heterogeneous network. However, the data processing capabilities of the server and, therefore the number of layers, are limited and it is desirable to transmit layers at data rates that are optimized to provide the highest quality to the greatest number of receivers.

A similar data transmission technique encodes multiple separate data streams. Typically, each data stream is encoded at a data rate targeted to a bandwidth suitable for one of the network connection types. However, the actual reception bandwidth of a data receiver may be considerably less than the ideal bandwidth for the receiver's connection type and the local reception bandwidth varies with time during the network session.

To avoid underutilization of higher capacity paths to subgroups of receivers of a multi-cast transmission, Jiang et al., ON THE USE OF DESTINATION SET GROUPING TO IMPROVE INTER-RECEIVER FAIRNESS OF MULTICAST ABR SESSIONS, Proceedings of IEEE Infocom '00, March 2000, have proposed partitioning the group of receivers into subgroups (destination set grouping (DSG)) maximizing inter-receiver fairness for a network session. Inter-receiver fairness is a measure quantifying the underutilization of a plurality of transmission paths when data is transmitted at a rate minimizing data loss on the path of least bandwidth. However, DSG requires the server to periodically poll connected routers which, in turn, poll additional connected routers to determine an isolated data rate for each receiver. The server then groups the receivers utilizing a grouping heuristic employing a plurality of criteria. However, the system is complex and requires considerable computation and additional network communication.

Smith et al., BANDWIDTH ALLOCATION FOR LAYERED MULTICASTED VIDEO, Proc. of the IEEE International Conference on Multimedia Computing and Systems (ICMCS), Florence, Italy, June 1999 have proposed a layered multicast control protocol (LMCP) in which the sender stripes the video signal across multiple multicast channels and each receiver adds or drops channels to meet its individual needs. Each receiver provides feedback to the sender by estimating a bottleneck rate based on a quantity of data lost and an elapsed time from the beginning of a channel joining experiment and the sender uses the feedback to adjust the transmission rate for each channel. Three algorithms were proposed for determining data transmission rates. A first algorithm utilized a dynamic programming solution to determine an optimal set of transmission rates but, according to the authors, was sufficiently complex as to be "impractical" for a large number of receivers. A divide and conquer algorithm which produces transmission rates comparable to those computed with the first algorithm was also proposed. While complex, the method was said to be useful for "reasonable" numbers of channels and receivers. A third algorithm selected transmission rates based on a fixed percentile which depended on the number of channels. This algorithm was not adaptive or dynamic and, according to the authors, did not perform well when the receiver bottleneck rates had certain distributions.

What is desired therefore, is a computationally conservative method of network server data transmission rate selection that selects transmission rates that are suitable for a plurality of network clients exhibiting heterogeneous reception bandwidth and useful with unicast and multicast data delivery mechanisms.

DETAILED DESCRIPTION OF THE INVENTION

Figure 1:
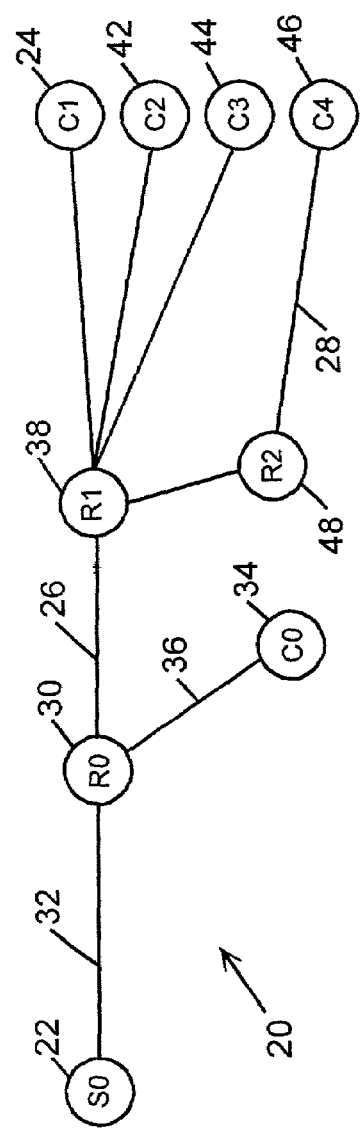
FIG. 1 is a schematic illustration of an exemplary data processing network.
Figure 2:
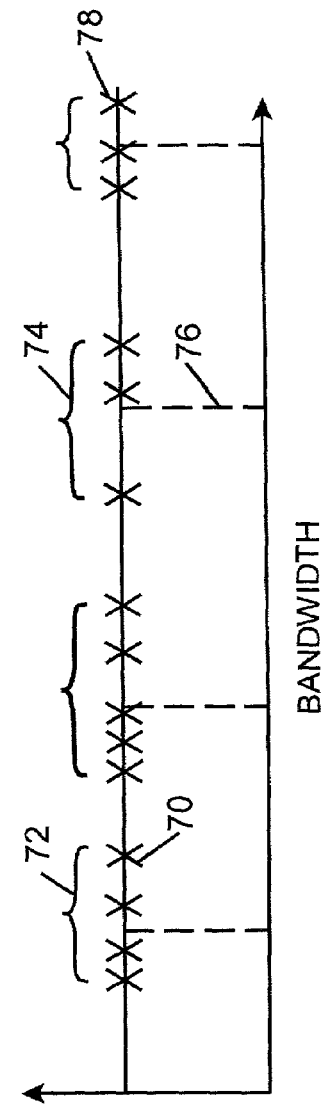
FIG. 2 is a schematic illustration of bandwidth clustering for a heterogeneous network.

Referring to FIG. 1, a data processing network 20 comprises a collection of nodes (for examples, nodes 22 and 24) connected by communication links (for examples, links 26 and 28) over which data can be transferred between end systems, the devices at network nodes that permit remote users to access information transmitted over the network (for examples, nodes 22 and 24). Network applications are often designed so that one computer or end system acts as a server (S0) 22 managing network traffic and providing services and data to receiver end systems or clients (for example, client (C1)) 24 attached to the network. On the other hand, network applications can provide for peer-to-peer operation where end systems may from time to time assume alternate roles of client or server. In either event, during a network session the data is transferred between end systems over a communication channel or path comprising links having limited data capacity or bandwidth. In addition, the bandwidth of the links making up a communication path from a data transmitter to a data receiver varies with time as network congestion increases and decreases due to a variety of factors. Each communication path between a source and a receiver or a group of receivers is likely to have a bandwidth limitation that differs from the bandwidth available to other receivers connected to the network. In other words, the bandwidth of the network is heterogeneous. For example, an exemplary source (server S0) 22 may be connected to a first router (R0) or switch 30 by a 100 Mbps Ethernet connection 32. An exemplary first receiver (C0) 34 is connected to the router 30 by a 10 Mbps Ethernet connection 36. The first router (R0) 30 is also connected to a second router (R1) 38 through a 1.5 Mbps T1 connection 26. As a result, the total maximum bandwidth available for the receivers (C1 24, C2 42, and C3 44) that are connected to the second router 38 and the receiver (C4) 46 connected the third router (R2) 48 is limited to 1.5 Mbps by the bottleneck link 26 even if the individual connections to the second router 38 have bandwidth greater than 1.5 Mbps. On the other hand, the bandwidth of one or more of the connections to the receivers C1 24, C2 42, and C3 44 may differ and may limit the local reception bandwidth of the specific receiver to a fraction of bandwidth of the link 26. Furthermore, network congestion may further restrict the available bandwidth. Referring to FIG. 2, since the local reception bandwidth can be limited by conditions on any one of a number of links from the source 22 to the receiver or client, the reception bandwidth available to individual receivers (for examples, local reception bandwidths 70 and 78) are likely to be spread across a broad spectrum for a session that includes a number of receivers. The present inventor observed that a system for selecting data transmission rates required a convenient mechanism for grouping receivers, a mechanism for determining appropriate data rates for a plurality of data streams, and a feedback mechanism to permit the server to adjust for changes in bandwidth as the network session progresses.

Figure 3:
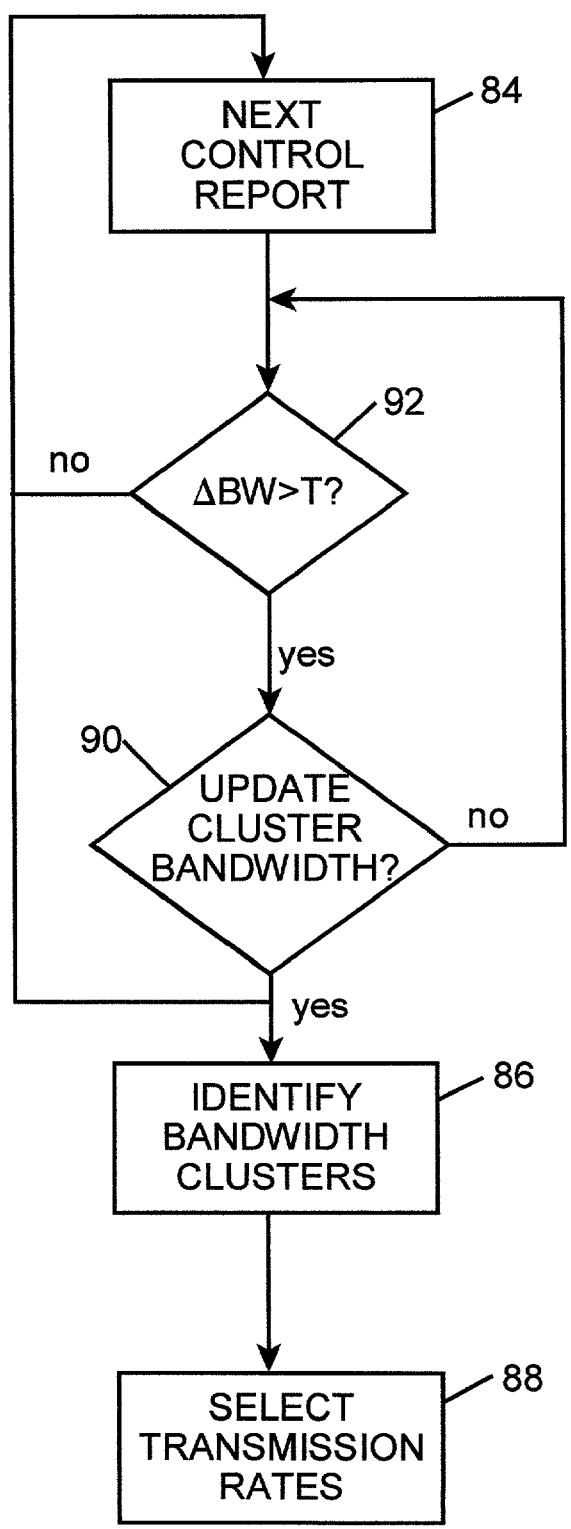
FIG. 3 is a block diagram of a data transmission rate selection method of the present invention.

The Real-Time Transport Portocol (RTP), Casner et al., RTP: A TRANSPORT PROTOCOL FOR REAL TIME APPLICATIONS, Internet Enginerring Task Force, January 2000, provides end-to-end network data transport functions for applications transmitting real-time data, such as audio, video, and simulation data, over multicast or unicast network services. The data transport function is augmented by a control protocol (RTP Control Protocol (RTCP)) that facilitates monitoring data delivery. The primary function of RTCP is to provide feedback on the quality of data distribution. To accomplish this each participant in a network session periodically transmits a control packet or report to all other participants in the session. Two nearly identical RTCP control packets, a sender report (SR) and a receiver report (RR), provide statistical information about the data received by the reporting participant from the sources identified in the report. Referring to FIG. 3, in the method of the present invention, the local reception bandwidth of each network data receiver is periodically reported in the RTCP sender and receiver reports 84. The reported bandwidth of the network is periodically evaluated by the server to identify clusters of receivers on the basis of local reception bandwidth 86 and to facilitate dynamic revision of the data rate selected for the data streams directed to each of the clusters 88.

The data from the RTCP reports are analyzed with a clustering algorithm to identify clusters of receivers reporting similar bandwidth. The K-means clustering algorithm sorts data points into k clusters (for examples, clusters 72 and 74 indicated by brackets in FIG. 2) by examining each data point representing the reported local reception bandwidth of one of the network receivers (for examples, local reception bandwidths 70 and 78) and assigning the data point (local reception bandwidth) to one of the clusters according the minimum distance from the data point to the mean of the bandwidth data points included in the cluster (for example, mean bandwidth 76 of cluster 74. The steps of determining a mean and assigning a reported bandwidth to a cluster is repeated until there is a convergence and no receiver moves to a different cluster. The number of clusters (k) to be identified in the bandwidth data is typically determined by the nature of the session and the characteristics of the server. For examples, the number of layers or separate data streams of a network session is generally determined by the processing power of the server and identifying a number of clusters equal to the number of layers of a layered bitstream or the number of separately encoded bitstreams is typically appropriate for a session.

The clustering step is carried out periodically at the server 86 using the current cluster centers as the initial cluster centers for the next clustering update. Since the clustering is periodically updated utilizing reported bandwidth, the initial cluster centers for the algorithm can be based on available information about the bandwidth of data receivers, such as the connection bandwidth of types of receivers (56 Kbps modem, DSL, cable modem, etc.) or spaced across the range of potential receiver bandwidth. The frequency of cluster updating is limited by the processing capabilities of the server but can be based on, for examples, receipt of a number of RTCP reports or the receipt of a number of reports wherein a threshold number of receivers report a change of bandwidth exceeding a change threshold 92.

Following identification of the bandwidth clusters, a data transmission rate is selected for the data stream directed to each cluster 88. Selecting a data transmission rate less than the minimum reception rate for any client in a cluster minimizes data packet loss, although some packet loss may still result from the use of the User Datagram Protocol (UDP). While this data rate provides the best available quality to the least capable client, the data rate and, therefore, the quality of the service for all receivers in the cluster is limited to the quality available at the receiver with the lowest bandwidth of all receivers in the cluster.

An alternative rate selection technique of the present invention, provides somewhat improved quality for receivers having greater local reception bandwidth at the expense of a higher data transmission rate and consequent increased data loss and reduced quality at the less capable receivers of the cluster. In the alternative rate selection technique, a data transmission rate is selected that minimizes a cost function relating distortion resulting from the loss of data during transmission and a utilization of the available reception bandwidth of a receiver. For a heterogeneous network, the cost function comprises the summation of the cost functions for all receivers:

$$C = \min_i \sum_M \sum_{j \in C_M} ((D_j(R^i, R_j)O_j) + (K_j f(R_j - R^i)(1 - O_j)))$$

where:

$O_j = 1$ if $R_j < R^i$ and $O_j = 0$ if $R_j \geq R^i$

M = the total number of clusters that the server will simultaneously encode $D_j(R^i, R_j)$ = the distortion resulting from the error concealment method used by the receiver's decoder $K_j$ = a weighting constant for the receiver j and can be selected to provide differing satisfaction levels for individual receivers $f(R_j - R^i)$ is a function of the underutilization of the reception bandwidth $R_j$ = the reception bandwidth of the receiver j $R^i$ = the transmission rate of the ith cluster to which the receiver j belongs Distortion ($D_j(R^i, R_j)$) can be quantified in number of ways for the purposes of the cost function. One metric for distortion expresses the propagation of error concealment distortion where the receiver utilizes the similarity of data from adjacent frames to determine a most probable substitute for lost data and then uses that information to cover up errors produced by the lose of data. Packetization is assumed to be based on a group of blocks (GOB) where one GOB occupies one real time transport (RTP) packet. Further, it is assumed that an RTP packet may be lost with a probability, P, that is independent of the probability of loss of another RTP packet. The probability of packet loss for a data receiver, j, is:

$$P_{ij}(R^i) = \frac{R^i - R_j}{R_j}$$

where: $P_{ij}(R^i)$ = the probability of packet loss for a receiver, j belonging to a cluster, i.

The probability of packet loss ($P_{ij}(R^i)$) is calculated from the fraction lost field of the RTP SR and RR reports. The fraction lost field quantifies the fraction of RTP data packets originating at a source that were lost since the previous SR or RR report packet was transmitted by the receiver. The fraction lost is expressed as eight bits and is defined to be the number of packets lost divided by then number of packets expected.

The error concealment distortion for a block of pixels ($Blk_{i,j,N}$) where j represents the block index within a group of blocks (GOB) having GOB index i within frame N can be expressed as the probability difference:

$EC_{i,j,N} = P*$(Distortion when $GOB_{i,N}$ is lost and concealed)$+(1-P)*$(Distortion when $GOB_{i,N}$ is not lost but $Blk_{i,j,N}$ is predicted from a concealed or a non-concealed block in frame N−1)

$EC_{i,j,N} = P*A_{i,j,N} + (1-P)*B_{i,j,N}$

For an error concealment method similar that of the ITU-T/SG15 (H.263+) video codec test model, TMN10, 1998:

$A_{i,j,N} = P*$(Distortion when $GOB_{i-1,N}$ is lost) +

(1 − P) ∗ (Distortion when $GOB_{i-1,N}$ is not lost)

$= P*C_{i,j,N} + (1-P)*D_{i,j,N}$

Substituting and ignoring the term corresponding to the square of the probability:

$A_{i,j,N} \approx (1-P)*D_{i,j,N}$

Since the error concealment distortion is calculated between the original block $B_{i,j,N}$ and the concealment block it includes distortion due to quantization.

The distortion ($D_{i,j,N}$) can be broken down by considering the motion vector range:

$D_{i,j,N} = (1 - P)*$(Distortion when $GOB_{i-1,N-1}$ and $GOB_{i,N-1}$ is not lost) +

$P(1 - P)*$(Distortion when $GOB_{i-1,N-1}$ is lost, $GOB_{i,N-1}$ is not lost) +

$(1 - P)P*$(Distortion when $GOB_{i-1,N-1}$ is not lost $GOB_{i,N-1}$ is lost) +

$P^2 *$(Distortion when $GOB_{i-1,N-1}$ and $GOB_{i,N-1}$ is not lost)

The last three factors may be ignored as they contain the terms $P^2$ and $P^3$ and the distortion can be expressed recursively as:

$$D_{i,j,N} = (1-P)^2 * \sum_{q=1}^{4} ((1 - Intra_{q,N-1}) * B_{q,N-1}\left(\frac{N_Q}{T}\right) +$$

$$Intra_{q,N-1} * (ODist(Blk_{i,j,N}, ReconBlk_{q,N-1}))$$

where: $B_{q,N-1}$=the previously calculated error concealment distortion term for the block Blk $q_{,N-1}$ of the frame N−1 which overlaps the prediction block for $Blk_{i,j,N}$ $ODist(Blk_{i,j,N}, ReconBlk_{q,N-1})$=the distortion between the overlapping parts of $Blk_{i,j,N}$ and $ReconBlk_{q,N-1}$ from the previous frame $Intra_{q,N-1}$=a flag variable which takes the value of "1" when $Blk_{q,N-1}$ is coded in intraframe mode and a value of "0" otherwise.

At each frame the values of $A_{i,j,N}$ and $B_{i,j,N}$ are stored for each block. The term $B_{i,j,N}$ is propagated from previous frames and is reset if the block $B_{i,j,N}$ is encoded in intraframe mode. The propagation of $B_{i,j,N}$ is expressed as:

$$B_{i,j,N} =$$
$$(1-P)^2 * (\text{Distortion when } GOB_{i-1,N-1} \text{ and } GOB_{i,N-1} \text{ is not lost}) +$$
$$P(1-P) * (\text{Distortion when } GOB_{i-1,N-1} \text{ is lost, } GOB_{i,N-1} \text{ is not lost}) +$$
$$(1-P)P * (\text{Distortion when } GOB_{i-1,N-1} \text{ is lost } GOB_{i,N-1} \text{ is not lost}) +$$
$$P^2 * (\text{Distortion when } GOB_{i-1,N-1} \text{ and } GOB_{i,N-1} \text{ is not lost})$$

The last term of the previous equation can be ignored and the remaining terms written recursively from the previous frame:

$$B_{i,j,N} = (1-P)^2 * (D_{i,j,N}) +$$
$$P(1-P) * \left(\sum_{q=1}^{2} A_{q,N-1}\left(\frac{N_q}{T}\right) + \sum_{q=3}^{4}\left((1 - Intra_{q,N-1}) * B_{q,N-1}\left(\frac{N_q}{T}\right) + (Intra_{q,N-1}) * (O(DistBlk_{i,j,N}, ReconBlk_{q,N-1}))\right)\right) +$$
$$(1-P)P * \left(\sum_{q=1}^{2}\left((1 - Intra_{q,N-1}) * B_{q,N-1}\left(\frac{N_q}{T}\right) + (Intra_{q,N-1}) * (ODist(Blk_{i,j,N}, ReconBlk_{q,N-1}))\right) + \sum_{q=3}^{4} A_{q,N-1}\left(\frac{N_q}{T}\right)\right)$$

For the first frame of the video sequence (typically intraframe coded):

$$EC_{i,j,1} = P * (\text{Distortion when } GOB_{i,1} \text{ is lost and concealed})$$
$$= P * A_{i,j,1},$$
$$A_{i,j,1} = Dist(Blk_{i,j,1}, PseudoBlk_{i,j,0}),$$
$$B_{i,j,1} = 0$$

The distortion for $Blk_{i,j}$ can be calculated by using a pseudo frame "0" according to previous agreement between the encoder and decoder. For example, $PseudoBlk_{i,j,o}$ may be a block with a constant value for all pixels.

For the second frame:

$$EC_{i,j,2} = P * A_{i,j,2} + (1-P) * B_{i,j,2} \text{ with}$$
$$D_{i,j,2} = (1-P)^2 * Dist(Blk_{i,j,2}, ReconBlk_{i-MVi,j-MVj,1}), \text{ and}$$
$$B_{i,j,2} = (1-P)^2 * (D_{i,j,2}) +$$
$$P(1-P) * \left(\sum_{q=1}^{2} A_{q,1}\left(\frac{N_q}{T}\right) + \sum_{q=3}^{4} ODist(Blk_{i,j,2}, ReconBlk_{q,1})\right) +$$
$$(1-P)P * \left(\sum_{q=1}^{2} ODist(Blk_{i,j,2}, ReconBlk_{q,1}) + \sum_{q=3}^{4} A_{q,1}\left(\frac{N_q}{T}\right)\right)$$

For the topmost GOB in a frame $A_{i,j,N}=D_{i,j,N}$ since there is no previous GOB ($GOB_{i-1,N}$) and the motion vector used for concealing the block from the frame N−1 will be set to zero.

The data transmission rate for the ith bandwidth cluster ($R^i$) is selected from the range of rates:

$$\left[\min_{j \in C_m} R_j, \frac{\min_{j \in C_m} R_j}{P_{\max}}\right]$$

where: $P_{max}$=the maximum loss probability and typically has a value of 0.1 or 0.2 but can be another value if as selected by the user.

Since an exhaustive search is computationally expensive, the range may be bisected and iterations discontinued when the difference between successive values of $R^i$ produces only a small difference in the cost function.

In the method of the present invention, statistics related to local reception bandwidth of a plurality of receivers engaged in a network session are gathered and the bandwidths of a plurality of receivers are clustered with a clustering algorithm. The clustering algorithm typically identifies a number of clusters equaling the number of layers of encoded data or the number of separate data streams and a data rate is selected for the receivers of each bandwidth cluster. The data rate may be a rate intended to minimize the data loss for the least capable receiver of the cluster or may be a somewhat higher rate determined by minimization of a cost function relating distortion for the receivers of the cluster with effectiveness of utilization of the local reception bandwidth for the receivers.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of selecting a data transmission rate for a network of data receivers having a plurality of local reception bandwidths, the method comprising the steps of:
   (a) receiving a report of said local reception bandwidth from each of a plurality of said data receivers;
   (b) identifying a plurality of bandwidth clusters from said reports of local reception bandwidth using an iterative procedure comprising the steps of:
      (i) assigning each of said reported local reception bandwidths to a respective one of said plurality of bandwidth clusters that has a mean bandwidth nearer to the assigned reported local reception bandwidth than other of said plurality of bandwidth clusters;
      (ii) updating respective mean bandwidths of the plurality of bandwidth clusters following the assignment of a local reception bandwidth to one of said plurality of bandwidth clusters; and
      (iii) repeating steps (i) and (ii) until there is a convergence and no local reception bandwidth is assigned to a different cluster following an update of a mean bandwidth of one of said plurality of bandwidth clusters; and
   (c) selecting a data transmission rate that minimizes a loss of data for a receiver reporting a minimum bandwidth included in a bandwidth cluster.

2. The method of claim 1 wherein said data transmission rate comprises a data transmission rate for a layer of data incrementally enhancing a base layer.

3. The method of claim 1 wherein the step of receiving a report of local reception bandwidth comprises the step of receiving a Real-Time Control Protocol control packet.

4. The method of claim 1 further comprising the step of repeating said identification of bandwidth clusters following receipt of a predetermined number of said reports of local reception bandwidth.

5. The method of claim 1 further comprising the step of repeating said identification of bandwidth clusters following receipt of a predetermined number of said reports reporting a change of local reception bandwidth exceeding a threshold change.

6. A method of selecting a data transmission rate for a network of data receivers having a plurality of local reception bandwidths, the method comprising the steps of:
   (a) receiving a report of said local reception bandwidth from each of a plurality of said data receivers;
   (b) identifying a plurality of bandwidth clusters from said reports of local reception bandwidth using a procedure comprising the steps of:
      (i) assigning a reported local reception bandwidth to a first bandwidth cluster if said reported local reception bandwidth is nearer a mean bandwidth of a first bandwidth cluster than a mean bandwidth of a second bandwidth cluster; and
      (ii) otherwise assigning said reported local reception bandwidth to said second cluster; and
   (c) selecting a data transmission rate for a bandwidth cluster that minimizes a cost function proportional to both a distortion of said data transmission rate at a receiver and an underutilization of available local reception bandwidth for said receiver where said distortion is proportional to the data transmission rate to a bandwidth cluster and said underutilization of available local reception bandwidth is inversely proportional to the data transmission rate for said bandwidth cluster.

7. The method of claim 6 wherein said data transmission rate comprises a data transmission rate for a layer of data incrementally enhancing a base layer.

8. The method of claim 6 wherein the step of receiving a report of local reception bandwidth comprises the step of receiving a Real-Time Control Protocol control packet.

9. The method of claim 6 further comprising the step of repeating said identification of bandwidth clusters following receipt of a predetermined number of said reports of local reception bandwidth.

10. The method of claim 6 further comprising the step of repeating said identification of bandwidth clusters following receipt of a predetermined number of said reports reporting a change of local reception bandwidth exceeding a threshold change.

11. The method of claim 6 wherein said cost function is proportional to a propagation of an error concealment distortion and said underutilization of said local reception bandwidth.

12. A method of selecting a data transmission rate for a network of data receivers having a plurality of local reception bandwidths, the method comprising the steps of:
   (a) receiving a report of said local reception bandwidth from each of a plurality of said data receivers;
   (b) identifying in said plurality of reported local reception bandwidths a number of clusters equal to a number of data streams to be transmitted using a procedure comprising the steps of:
      (i) assigning a reported local reception bandwidth to a first bandwidth cluster if said reported local reception bandwidth is nearer a mean bandwidth of a first bandwidth cluster than a mean bandwidth of a second bandwidth cluster; and
      (ii) otherwise assigning said reported local reception bandwidth to said second cluster;
   (c) selecting a data transmission rate for a data stream minimizing a cost function proportional to both a distortion of said data transmission rate at a receiver and an underutilization of available local reception bandwidth for said receiver where said distortion is proportional to the data transmission rate to a bandwidth cluster and said underutilization of available local reception bandwidth is inversely proportional to the data transmission rate for said bandwidth cluster; and
   (d) repeating steps (b) and (c) following receipt of a predetermined number of said reports.

13. The method of claim 12 wherein the step of repeating steps (b) and (c) following receipt of a predetermined number of said reports comprises the steps of:
   (a) comparing a reported local reception bandwidth for a data receiver to a prior reported local reception bandwidth for said data receiver; and
   (b) repeating steps revising said bandwidth clusters and selecting said data transmission rate after a predetermined number of receivers reported a change in local reception bandwidth exceeding a threshold change.

14. The method of claim 12 wherein said data transmission rate comprises a data transmission rate for a layer of data incrementally enhancing a base layer.

15. The method of claim 12 wherein the step of receiving a report of local reception bandwidth comprises the step of receiving a Real-Time Control Protocol control packet.

* * * * *

UNITED STATES PATENT AND TRADEMARK OFFICE
CERTIFICATE OF CORRECTION

PATENT NO. : 7,191,246 B2 Page 1 of 1
APPLICATION NO. : 09/908677
DATED : March 13, 2007
INVENTOR(S) : Deshpande It is certified that error appears in the above-identified patent and that said Letters Patent is hereby corrected as shown below:

Column 4, line 20 - change "portocol" to --protocol--

Column 4, line 56 - change "cluster 74." to --cluster 74).--

Column 5, line 45 - change "$R_f<R^1$" to --$R_f<R^i$--

Column 6, line 25 - change "$(Blk_{ij,N})$" to --$(Blk_{ij,N})$--

Signed and Sealed this

Tenth Day of June, 2008

JON W. DUDAS
*Director of the United States Patent and Trademark Office*